July 6, 1926.
J. H. HEROLD
POTATO PICKER
Filed June 13, 1924
1,591,824
4 Sheets-Sheet 1
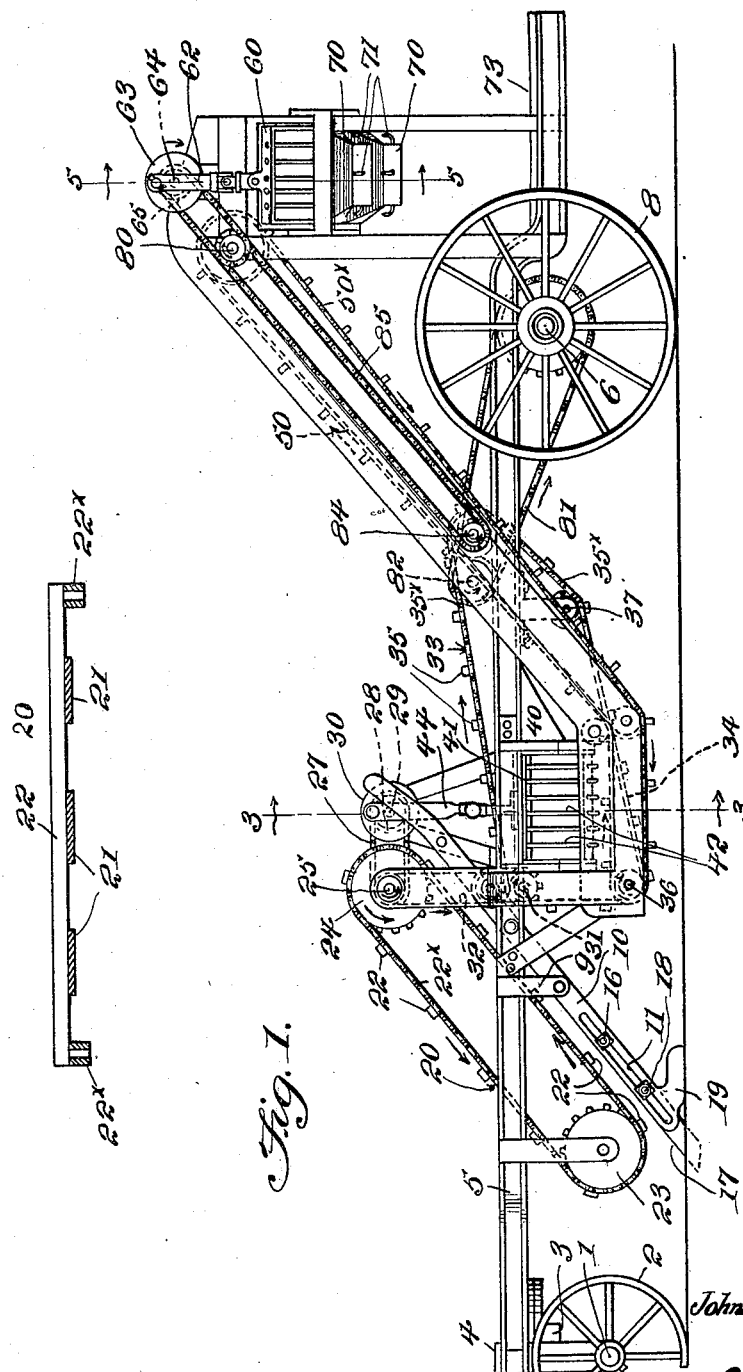
John H. Herold
INVENTOR
BY Victor J. Evans
ATTORNEY
WITNESS:

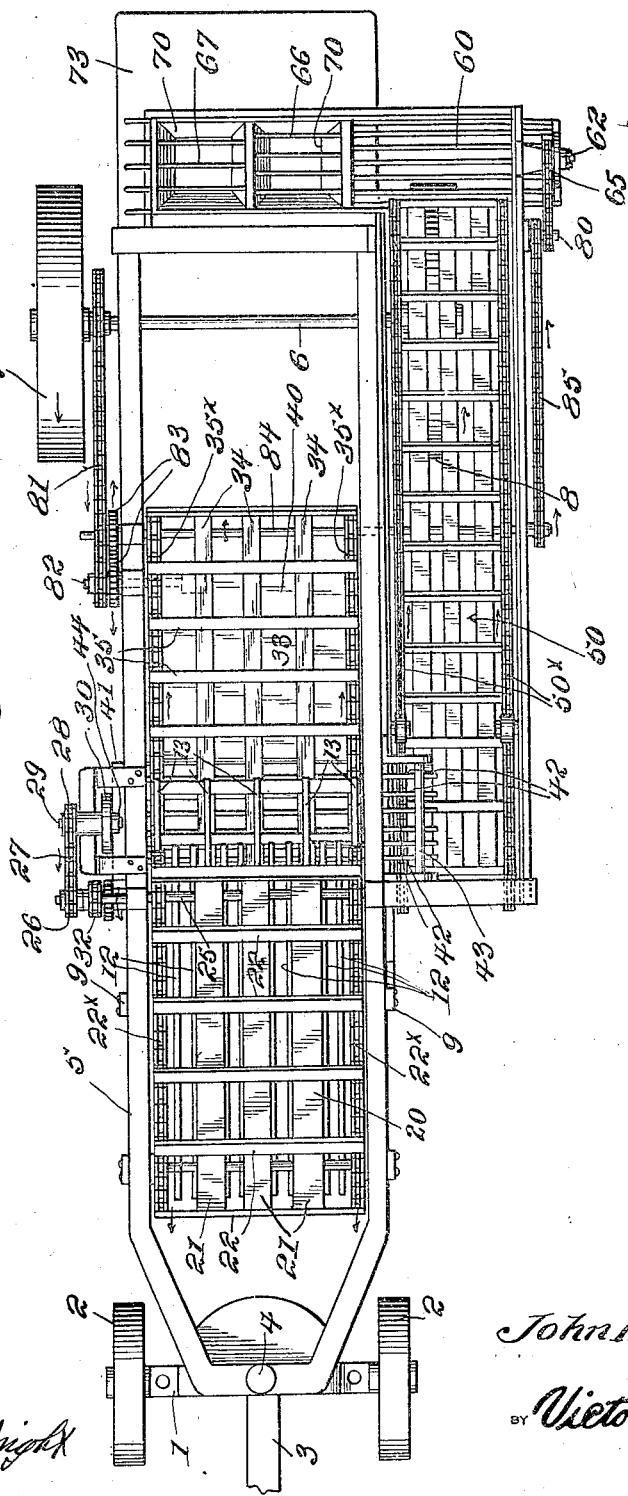

July 6, 1926. 1,591,824
J. H. HEROLD
POTATO PICKER
Filed June 13, 1924 4 Sheets-Sheet 3
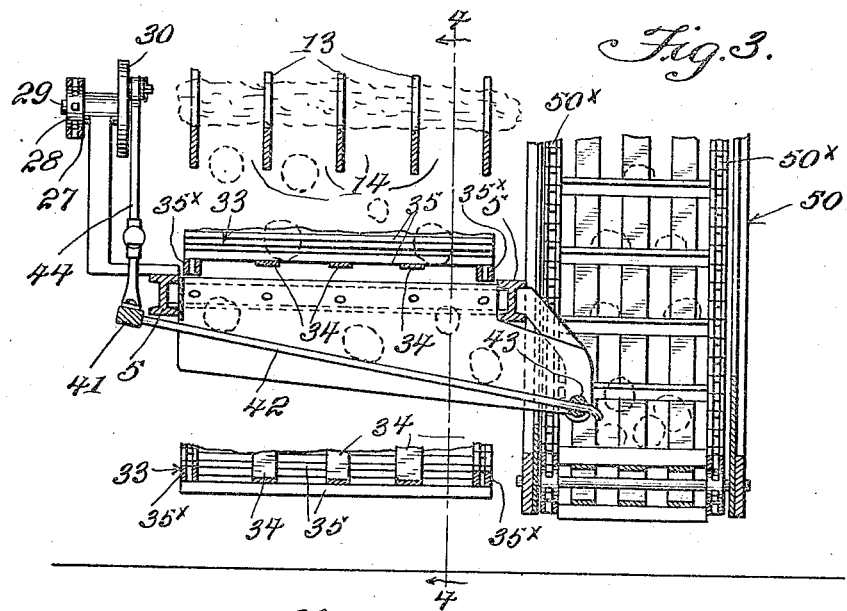
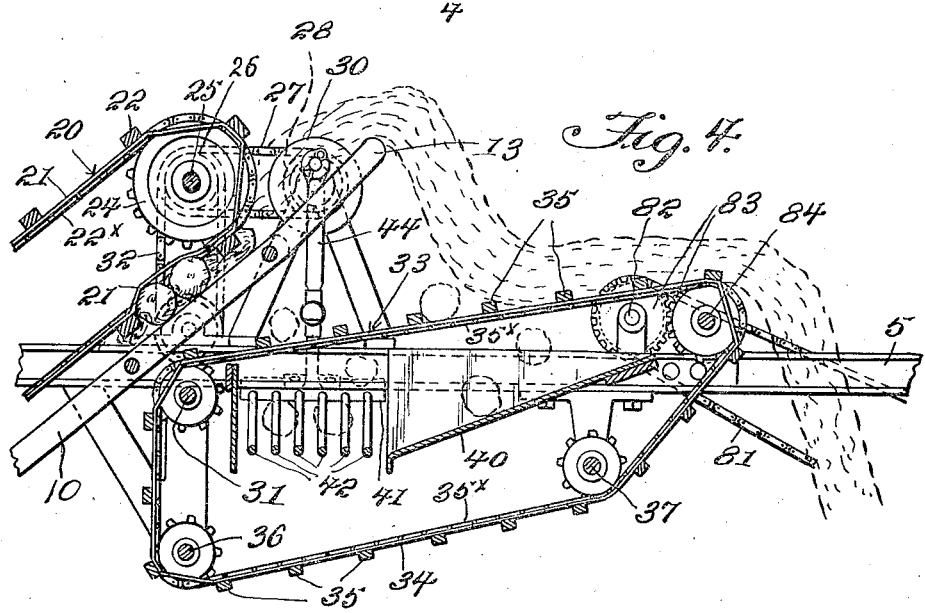
John H. Herold
INVENTOR
BY Victor J. Evans
ATTORNEY
WITNESS:

July 6, 1926.
J. H. HEROLD
POTATO PICKER
Filed June 13, 1924
1,591,824
4 Sheets-Sheet 4
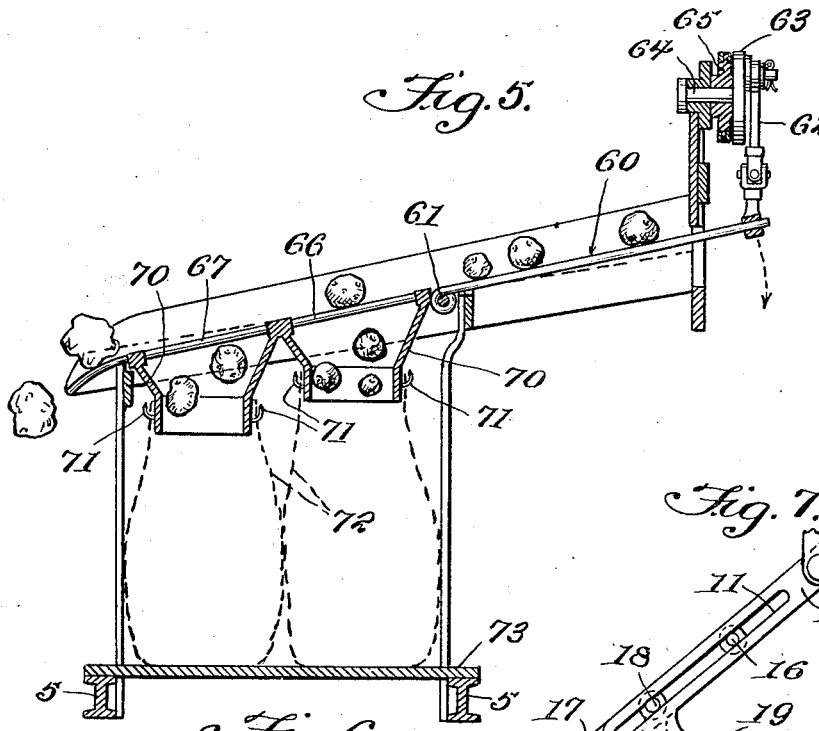
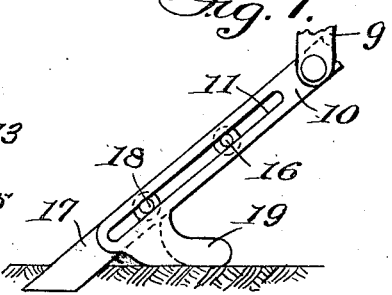
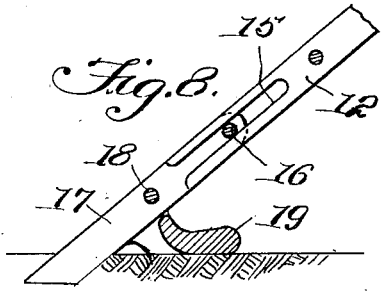
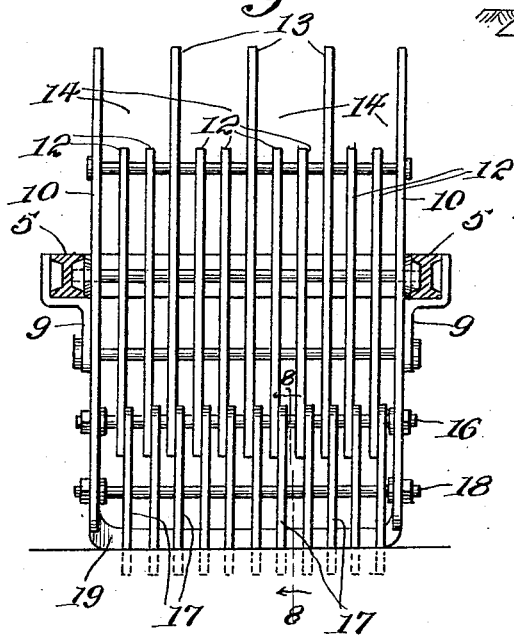
John H. Herold
INVENTOR
BY Victor J. Evans
ATTORNEY
WITNESS:

Patented July 6, 1926.

1,591,824

UNITED STATES PATENT OFFICE.

JOHN H. HEROLD, OF ERIE, NORTH DAKOTA.

POTATO PICKER.

Application filed June 13, 1924. Serial No. 719,884.

The object of my said invention is the provision of an apparatus for picking up potatoes after the digging of the potatoes by another apparatus and after the potatoes have been left on the ground to dry, my said apparatus being simple and strong in construction and reliable in operation and being adapted in addition to picking up potatoes to sort or grade the potatoes after separating the same from vines and other débris and dirt.

To the attainment of the foregoing, the invention consists in the improvement as hereinafter described and definitely claimed.

In the accompanying drawings, forming part of this specification:—

Figure 1 is a side elevation of the apparatus constituting the preferred embodiment of my invention.

Figure 2 is a top plan view of the apparatus.

Figure 3 is a transverse section taken in the plane indicated by the line 3—3 of Figure 1.

Figure 4 is a detail longitudinal vertical section on the line 4—4 of Figure 3.

Figure 5 is a cross-section taken on the line 5—5 of Figure 1.

Figure 6 is a detail view illustrating from the front the potato take-up.

Figure 7 is a fragmentary edge view of said take-up.

Figure 8 is a detail vertical section on the line 8—8 of Figure 6.

Figure 9 is an enlarged detail cross-section of one of the conveyors comprised in the apparatus.

Similar numerals of reference designate corresponding parts in all of the views of the drawings.

Among other elements my novel apparatus comprises a front axle 1 equipped with ground wheels 2 and a tongue 3, and pivoted at 4 to the main frame 5 of the apparatus. The said main frame 5 may be of the construction illustrated or of any other construction compatible with the purpose of my invention. As shown said frame 5 has side bars of I-form in cross-section, Figure 6, and the rear portion of the frame is supported on a rear axle 6 equipped with ground wheels 7 and 8, Figure 2.

Connected by pendent arms 9 with the said bars of the main frame 5 are the side bars 10 of the inclined take-up which side bars 10 are longitudinally slotted as designated by 11. In addition to the side bars 10, the take-up includes spaced inclined bars 12 and 13, the bars 13 being extended above the bars 12 as shown so as to afford comparatively wide spaces 14 at the upper and rear end of the take-up. It will also be noticed by comparison of Figures 6 and 8 that the lower portions of the bars 12 and 13 are slotted as designated by 15 in Figure 8 for the adjustment of a cross rod 16 to which are connected the lower bars 17 of the take-up, the said bars 17 being connected by the rod 16 and by an additional rod 18 to the side bars 10, and said bars 17 being equipped with a transverse shoe or runner 19 adapted to rest and move on the ground after the manner shown in Figures 6 and 8. Manifestly, by adjusting the bars 17 and the shoe 19 and adjustably fixing the same with respect to the side bars 10 and the other bars of the take-up the extent to which the bars 17 extend into the ground may be regulated.

As its name imports the take-up described is designed to take up potatoes from the ground, and in association with the said take-up, I employ a conveyor 20 made up of belts 21 of rubber and cross rods 22 carried by the said belts and spaced a considerable distance apart as illustrated. The said belts 21 of the conveyor 20 are connected by the rods 22 to sprocket belts 22$^x$, mounted on sprocket gears 23 and 24, the upper gears 24 being fixed on a shaft 25 that is equipped with a drive sprocket gear 26, Figures 2 and 4. The said gear 26 is connected by a sprocket belt 27 with a sprocket gear 28 on a transverse shaft 29 by which is also carried a crank disk 30, Figures 1 and 2. It will also be understood that the shaft 25 and consequently the conveyor 20 and the shaft 29 are driven from a transverse shaft 31 through the medium of sprocket gears and a sprocket belt 32.

At 33, Figures 1 and 4, is a vine conveyor made up of rubber belts 34 and cross rods 35. The said belts are connected by the rods 35 to sprocket belts 35× passed over sprocket gears on the before mentioned shaft 31, and sprocket gears on shafts 36, 37 and 84.

Arranged within the conveyor 33—i. e., between the lower and upper stretches thereof is a longitudinal chute 40 which is inclined downwardly and forwardly as appears in Figures 1 and 4.

Also arranged between the upper and lower stretches of the conveyor 33 is an inclined, transverse shaking screen 41, Figures 3, 4 and 1. The said screen 41 comprises spaced rods 42, and is pivoted at 43 on the main frame, and is connected at 44 with a wrist pin on the before mentioned crank disk 30. Manifestly, when the apparatus is in operation and the disk 30 is rotated, the screen 41 will be vertically oscillated so as to facilitate the movement down the screen of potatoes received on the screen from the upper stretch of the conveyor 33. It will also be understood that the movement described of the potatoes contributes to the separation from the potatoes of dirt and débris. It will also be understood that such potatoes as fall through the upper stretch of the conveyor 33 in rear of the screen 41 will be conducted to the said screen by the longitudinal chute 40. The conveyor 33 serves to separate vines from the potatoes and also serves to convey the vines rearwardly after the manner shown in Figure 4 so that the vines will be dropped from the apparatus to the ground. The screen 41 is arranged to discharge potatoes after the manner shown in Figure 3 on the upper stretch of the endless conveyor 50 having belts and spaced cross slats as illustrated, and also having side sprocket belts 50× for co-operation with sprocket gears as shown. The endless conveyor 50 is provided with a rearwardly and upwardly inclined portion as illustrated and hence is adapted to convey potatoes to and discharge the same on a transverse shaking screen 60, Figures 2 and 5. The said screen 60 is inclined and is pivotally mounted at 61 and is connected at 62 to a wrist pin on a crank disk 63 carried by a shaft 64 on which is fixed a sprocket gear 65. Manifestly when the disk 63 is rotated the screen 60 will be vertically oscillated to facilitate the movement of potatoes in the direction of the length of the screen. It will also be noted by reference to Figure 2 that some of the rods or bars 67 of the screen 60 are arranged a greater distance apart than are the bars 66 of the screen, the bars 67 being arranged comparatively remote from the discharge portions of the conveyor and the elevator 50. The screen 60 forms in combination with fixed hoppers 70 the grader or sorter of my improvement, the hoppers 70 being provided with hooks 71 or other appropriate means for the detachable connection of bags 72, designed to be positioned on a platform 73, all as best shown in Figure 5. In virtue of the construction just described it will be manifest that the comparatively small potatoes will drop between the bars 66 of the screen 60 while the larger potatoes will drop between the bars 67 of the screen 60.

The platform 73 is arranged at the extreme rear end of the frame of the apparatus, and manifestly when desirable or necessary an attendant may stand on the said platform, particularly for convenience in handling the bags.

The shaft 64, Figures 1 and 2 is driven from the upper shaft 80 of the conveyor and elevator 50, and the conveyor 50 is driven by the said shaft 80 which derives its motion from the ground wheel 7 through the medium of the sprocket belt 81, Figure 2, and idler shaft 82 connected to said belt and geared at 83 to the transverse shaft 84, and a belt 85 connecting the shaft 84 and the shaft 80. The conveyor 33 is driven by the shaft 84 and the appurtenances of said shaft, and the before mentioned shaft 31 is driven by the said conveyor 33 and motion is taken from the shaft 31, through the driving connections before described to actuate the conveyor 21 and the crank disk 30.

It will be apparent from the foregoing that notwithstanding the capacity of my novel apparatus, the apparatus is simple and inexpensive in construction and is well adapted to withstand the usage to which apparatus of corresponding character is ordinarily subjected.

I have specifically described the construction and relative arrangement of the parts comprised in the preferred embodiment of my invention in order to impart a full, clear and exact understanding of the said embodiment. I do not desire, however, to be understood as confining myself to said specific construction and relative arrangement of parts inasmuch as the scope of my invention is defined by my appended claims, and within such scope various changes or modifications may be made without departing from my invention.

Having described my invention, what I claim and desire to secure by Letters Patent, is:—

1. In a potato harvesting apparatus, the combination of a main frame, an endless conveyor carried by the said frame and arranged in inclined position, and an inclined take-up carried by the frame and arranged in parallelism to and spaced from the lower stretch of said conveyor, said take-up having slotted side bars, and also having spaced bars intermediate of the side bars, certain of said bars being extended above adjacent bars to afford upper comparatively wide spaces, and bars adjustable to the side bars and the first-named intermediate bars and equipped with a shoe arranged to rest and move on the ground.

2. In a potato harvester a frame and an inclined take-up carried by the frame and having a lower adjustable portion including spaced bars arranged to travel through the ground, and a shoe carried by the said spaced bars and arranged to rest and move on the ground.

In testimony whereof I affix my signature.

JOHN H. HEROLD.